United States Patent
Weerappuli

(10) Patent No.: US 10,457,241 B2
(45) Date of Patent: Oct. 29, 2019

(54) AIRBAG ASSEMBLY INCLUDING A DEFLECTOR

(71) Applicant: Ford Global Technologies, LLC, Dearborn, MI (US)

(72) Inventor: Parakrama Valentine Weerappuli, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 144 days.

(21) Appl. No.: 15/337,350

(22) Filed: Oct. 28, 2016

(65) Prior Publication Data

US 2018/0118151 A1 May 3, 2018

(51) Int. Cl.
| | |
|---|---|
| *B60R 21/215* | (2011.01) |
| *B60R 21/01* | (2006.01) |
| *B60R 21/205* | (2011.01) |
| *B60R 21/264* | (2006.01) |
| *B60R 21/00* | (2006.01) |
| *B60R 21/16* | (2006.01) |

(52) U.S. Cl.
CPC .......... *B60R 21/215* (2013.01); *B60R 21/01* (2013.01); *B60R 21/205* (2013.01); *B60R 21/264* (2013.01); *B60R 2021/0004* (2013.01); *B60R 2021/0009* (2013.01); *B60R 2021/01211* (2013.01); *B60R 2021/161* (2013.01); *B60R 2021/21518* (2013.01); *B60R 2021/21537* (2013.01)

(58) Field of Classification Search
CPC ..................................................... B60R 21/215
USPC ...................................................... 280/728.3
See application file for complete search history.

(56) References Cited

U.S. PATENT DOCUMENTS

| | | | |
|---|---|---|---|
| 4,773,673 A * | 9/1988 | Sakurai ................ | B60R 21/215 280/728.3 |
| 5,348,343 A | 9/1994 | Hawthorn | |
| 5,385,366 A | 1/1995 | Frank et al. | |
| 5,616,045 A * | 4/1997 | Gauker ................ | B60R 21/017 439/352 |
| 5,630,614 A | 5/1997 | Conlee et al. | |

(Continued)

FOREIGN PATENT DOCUMENTS

| | | | |
|---|---|---|---|
| DE | 19915974 A1 * | 10/2000 | ......... B60R 21/2165 |
| GB | 2399548 A * | 9/2004 | ............. B60R 21/26 |

(Continued)

OTHER PUBLICATIONS

UK Search Report dated Mar. 22, 2018 re GB Appl. No. 1717539.9.

*Primary Examiner* — Faye M Fleming
(74) *Attorney, Agent, or Firm* — Frank A. MacKenzie; Bejin Bieneman PLC

(57) ABSTRACT

An airbag assembly for a vehicle that includes a housing, an airbag supported by the housing, a deflector pivotally coupled to the housing, and a lock between the deflector and the housing. The lock is moveable relative to the deflector and the housing from an unlocked position disengaged with at least one of the deflector and the housing to a locked position engaged with both the deflector and the housing. The deflector may allow the airbag to deploy, without deflecting the airbag in response to one type of sensed impact, e.g., a full-width frontal impact, and may deflect the airbag in response to another type of sensed impact, e.g., oblique frontal impact.

19 Claims, 12 Drawing Sheets

(56) References Cited

U.S. PATENT DOCUMENTS

| | | | |
|---|---|---|---|
| 6,499,765 B2 | 12/2002 | Hawthorn et al. | |
| 6,669,229 B2 | 12/2003 | Thomas | |
| 6,733,033 B2 * | 5/2004 | Muller | B60R 21/205 |
| | | | 280/728.3 |
| 6,942,242 B2 | 9/2005 | Hawthorn et al. | |
| 7,021,653 B2 | 4/2006 | Burdock et al. | |
| 7,210,701 B2 | 5/2007 | Meissner et al. | |
| 8,550,491 B2 * | 10/2013 | Kuroe | B60R 21/215 |
| | | | 280/728.2 |
| 9,371,052 B2 * | 6/2016 | Mallinger | B60R 21/205 |
| 2010/0140904 A1 * | 6/2010 | Choi | B60R 21/215 |
| | | | 280/728.3 |
| 2012/0119474 A1 | 5/2012 | Li et al. | |

FOREIGN PATENT DOCUMENTS

| | | | | |
|---|---|---|---|---|
| JP | 09183351 A | * | 7/1997 | B60R 21/20 |
| JP | 2005343267 A | | 12/2005 | |

\* cited by examiner

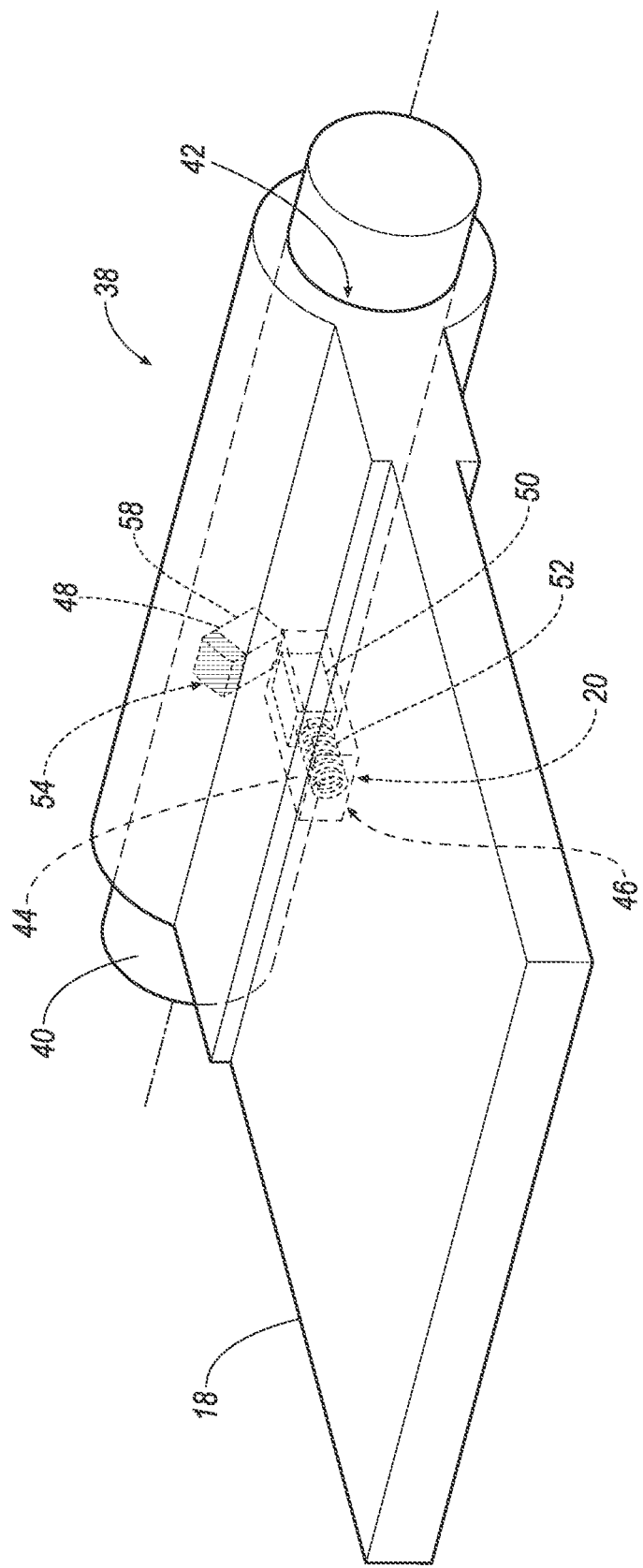

AIRBAG ASSEMBLY INCLUDING A DEFLECTOR

BACKGROUND

Vehicles, such as automobiles, may include airbags designed to inflate and be impacted by occupants of a front seat during a frontal impact of the vehicle. Front airbags may, for example, be mounted in front of an occupant. For example, a driver airbag may be supported by a steering wheel and a passenger airbag may be supported by an instrument panel. The driver airbag may be impacted by an occupant in a driver seat, and the passenger airbag may be impacted by an occupant of a passenger seat during the frontal impact.

During a full-width frontal impact, the vehicle be impacted by another object across the full width of the front of the vehicle. This type of impact may cause the occupant to move directly forward in the vehicle. During an oblique frontal impact of the vehicle, the vehicle may be impacted by another object at an angle and/or may be impacted by another object offset from a longitudinal centerline of the vehicle. This type of impact may cause an occupant to move in both a vehicle-forward direction and a cross-vehicle direction, i.e., forwardly and toward the impacted corner of the vehicle. In this instance, the occupant may impact the front airbag, e.g., the driver airbag or the passenger airbag, at an angle. Similarly, during a side impact of the vehicle, the occupant may impact the front airbag, e.g., the driver airbag or the passenger airbag, as the occupant is urged in a cross-vehicle direction.

BRIEF DESCRIPTION OF THE DRAWINGS

FIG. 5 is a perspective view of the deflector and a portion of a housing.

DETAILED DESCRIPTION

Figure 1:
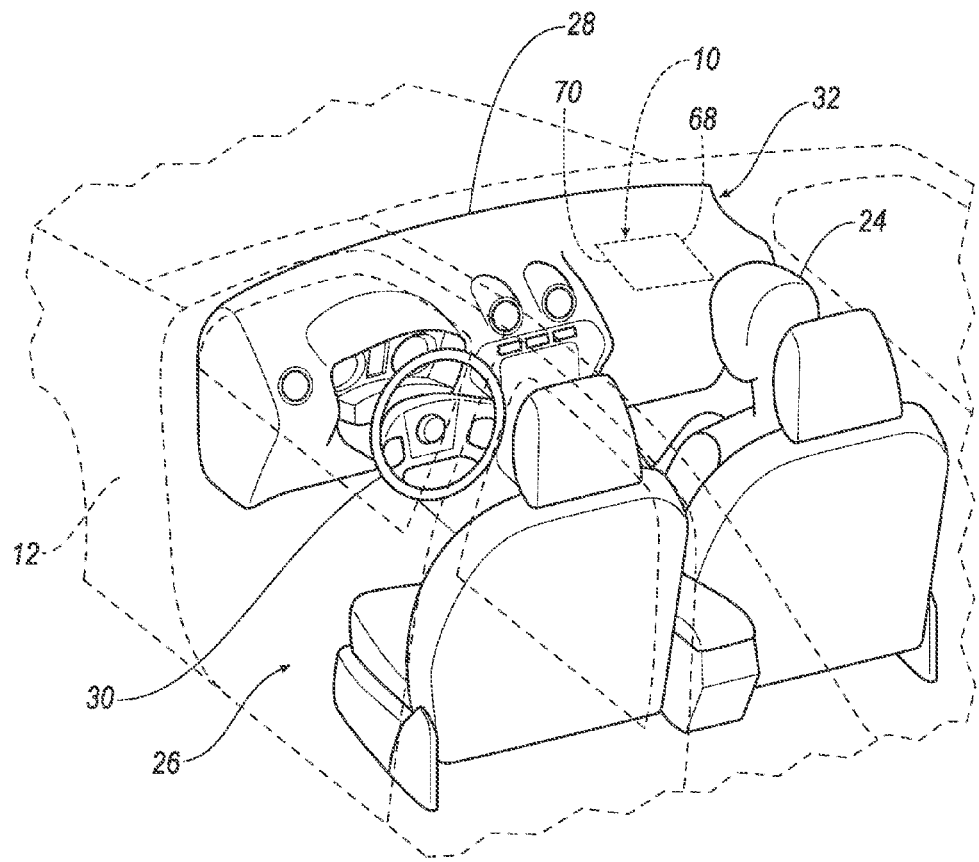
FIG. 1 is a perspective view of a portion of a vehicle including an airbag assembly shown in hidden lines and with an airbag in an uninflated position.

With reference to the Figures, wherein like numerals indicate like parts throughout the several views, an airbag assembly 10 for a vehicle 12 includes a housing 14, an airbag 16 supported by the housing 14, a deflector 18, 118 pivotally coupled to the housing 14, and a lock 20 between the deflector 18, 118 and the housing 14. The lock 20 is moveable relative to the deflector 18, 118 and the housing 14 from an unlocked position disengaged with at least one of the deflector 18, 118 and the housing 14 to a locked position engaged with both the deflector 18, 118 and the housing 14.

When an impact of the vehicle 12 is sensed, the airbag 16 may be inflated and, based on the direction of vehicle impact, the deflector 18, 118 may selectively deflect the airbag 16 as the airbag 16 is inflated. Specifically, the lock 20 may be in the unlocked position or in the locked position based on the direction of vehicle impact. The lock 20 in the unlocked position allows the deflector 18, 118 to freely pivot relative to the housing 14, thus allowing the airbag 16 to inflate without deflection of the airbag 16 by the deflector 18, 118. The lock 20 in the locked position limits or prevents movement of the deflector 18, 118 relative to the housing 14 and deflects the airbag 16 during inflation of the airbag 16.

For example, in the event of a full-width frontal impact of the vehicle 12 (identified with force F in FIG. 2), the lock 20 is placed in the unlocked position to allow the deflector 18, 118 to freely pivot relative to the housing 14, which allows the airbag 16 to inflate without being deflected by the deflector 18, 118. This inflation of the airbag 16, without deflection by the deflector 18, 118, positions the airbag 16 to be impacted by an occupant 24 moving in a vehicle-forward direction during the full-width frontal impact. As another example, in the event of an oblique frontal impact (as identified by force F in FIG. 3), the lock 20 is placed in the locked position to lock the deflector 18, 118 relative to the housing 14 to deflect the airbag 16 during inflation of the airbag 16, thus biasing the airbag 16 toward the path of the occupant 24 moving in a vehicle-forward and cross-vehicle direction during the oblique frontal impact. In this position, the airbag assembly 10 may reduce the likelihood of rotation of the head of the occupant 24 during the oblique frontal impact and may reduce the likelihood of the head of the occupant 24 sliding across the airbag 16 during the oblique frontal impact. One example embodiment of the deflector 18, 118 is shown in FIGS. 1-6C. Another example embodiment of the deflector 18, 118 is shown in FIGS. 8-9B.

With reference to FIG. 1, the vehicle 12 includes a passenger cabin 26. The vehicle 12 includes seats and an instrument panel 28 in the passenger cabin 26. The instrument panel 28 may be disposed at the vehicle-forward end of the passenger cabin 26 and may include vehicle controls. A steering wheel 30 may be mounted to the instrument panel 28 in the passenger cabin 26.

The vehicle 12 includes a restraint system 32. In the example shown in FIGS. 1-3, the restraint system 32 includes the airbag assembly 10 and the instrument panel 28. Specifically, the airbag assembly 10 is supported by the instrument panel 28. In this example, the airbag assembly 10 may be a passenger airbag assembly 10. In addition to, or in the alternative to the airbag assembly 10 being supported by the instrument panel 28, the restraint system 32 may include the steering wheel 30, and the airbag assembly 10, or a second identical airbag assembly 10, may be supported by the steering wheel 30, i.e., as a driver airbag assembly 10. Alternatively, the vehicle 12 may include any suitable number of airbag assemblies 10 and each airbag assembly 10 may be supported by any suitable component of the vehicle 12 at any suitable location in the passenger cabin 26.

Figure 4A:
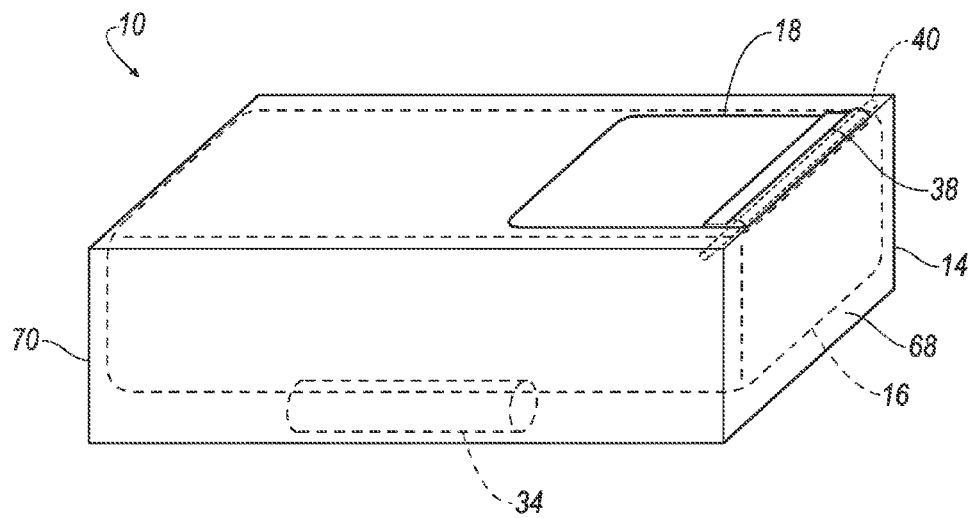
FIG. 4A is a perspective view of one embodiment of the airbag assembly including one deflector.
Figure 4B:
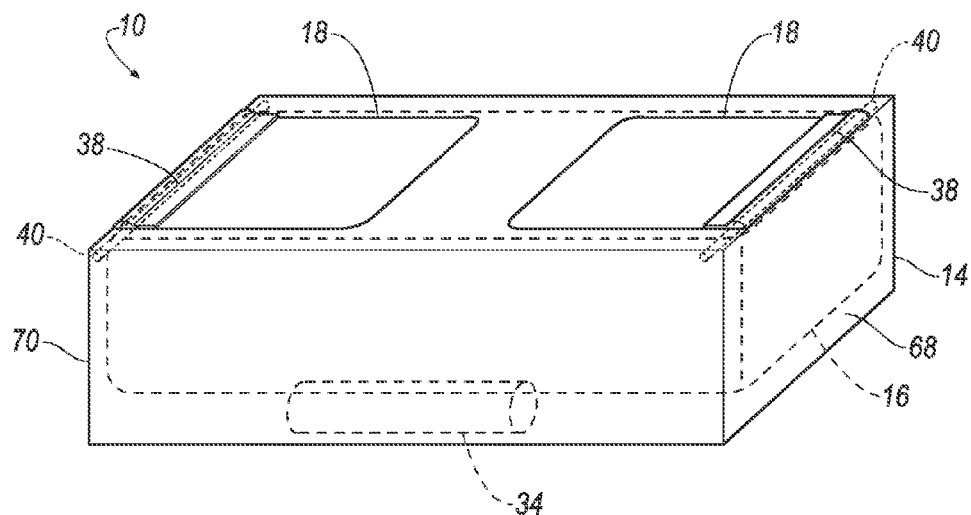
FIG. 4B is a perspective view of another embodiment of the airbag assembly including two deflectors.

The airbag assembly 10 may, for example, also be referred to as a "passive restraint," i.e., is automatically inflated when a vehicle impact is sensed without input from the occupant 24, as discussed below. One embodiment of the airbag assembly 10, including one deflector 18, 118, is shown for example in FIG. 4A. Another example, FIG. 4B shows an embodiment of the airbag assembly 10 including two deflectors 18, 118. Common features in the embodiments of FIGS. 4A and 4B are identified with common numerals.

The housing 14 of the airbag assembly 10 may be connected to the instrument panel 28, e.g., with fasteners. The housing 14 of the airbag assembly 10 houses the airbag 16 in the uninflated position. The housing 14 may provide a reaction surface for the airbag 16 as the airbag 16 inflates from the uninflated position to the inflated position or a biased inflated position.

The inflator 34 may be disposed either inside the housing 14 or external to the housing 14, in which case the inflator 34 may be in fluid communication with the airbag 16 through a fill tube (not shown). The inflator 34 is in fluid communication with the airbag 16. Upon receiving a signal from, e.g., a controller 36 such as that described below, the inflator 34 may inflate the airbag 16 with an inflatable medium, such as a gas. The inflator 34 may be, for example, a pyrotechnic inflator that uses a chemical reaction to drive inflation medium to the airbag 16. The inflator 34 may be of any suitable type, for example, a cold-gas inflator.

Figure 2:
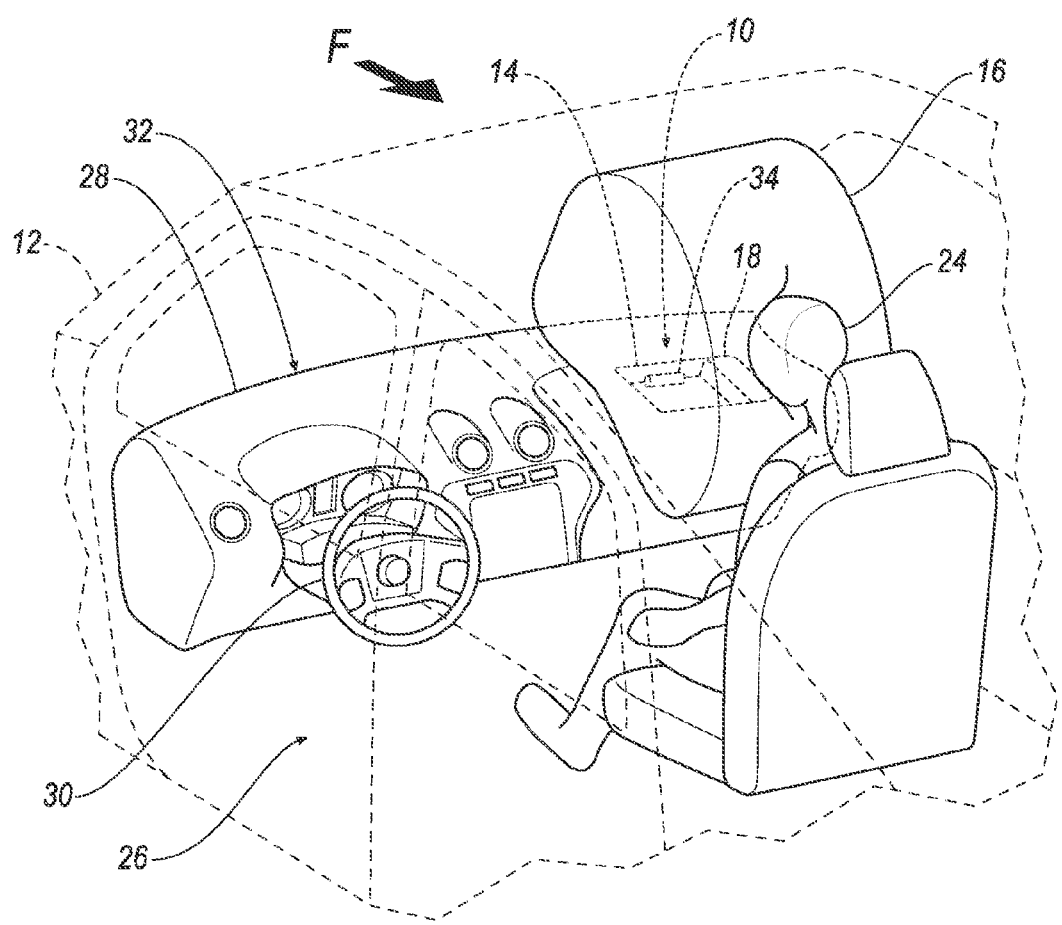
FIG. 2 is the perspective view of FIG. 1 with the airbag in an inflated position during a full-width frontal impact of the vehicle.
Figure 3:
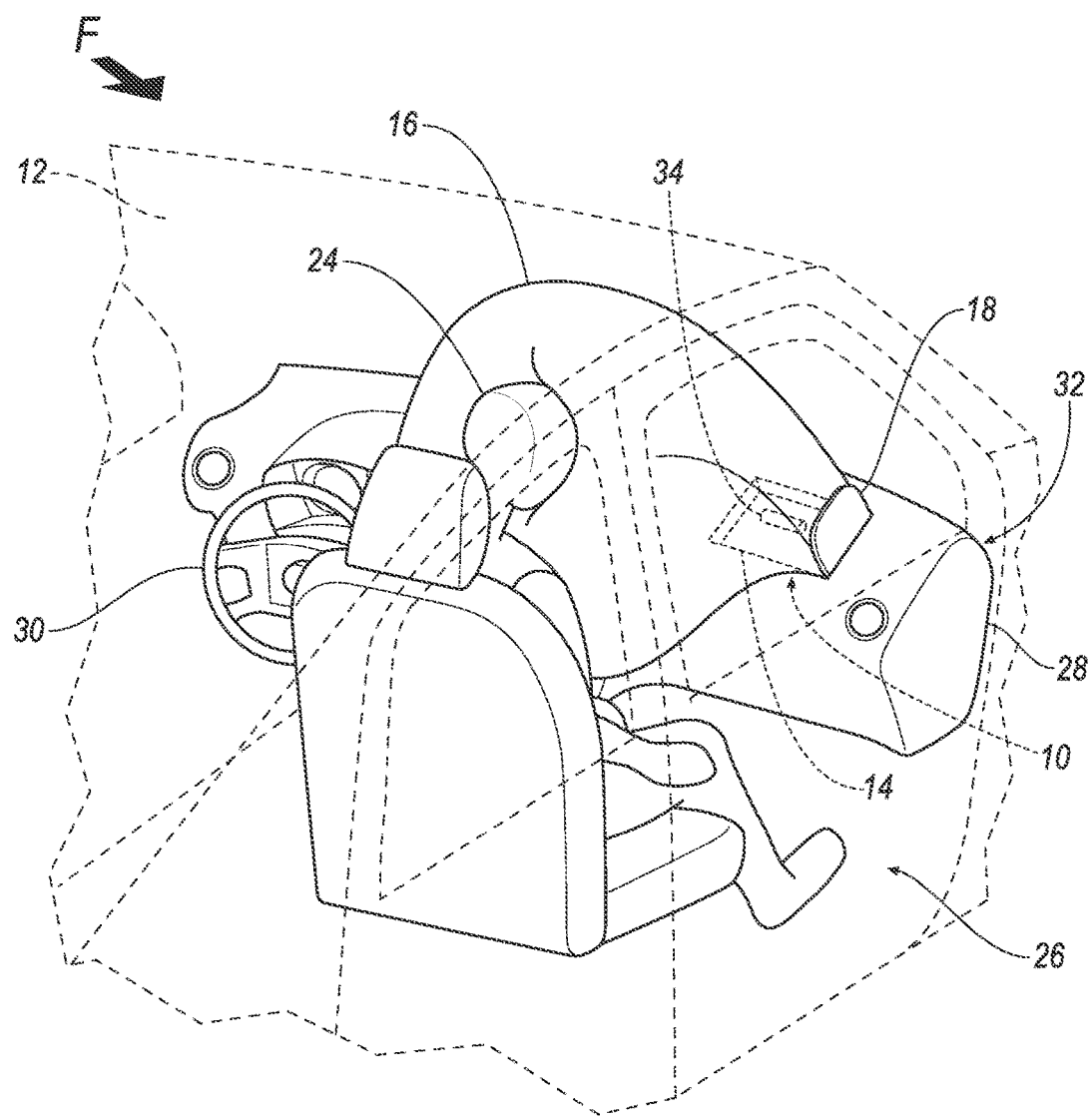
FIG. 3 is a perspective view of a portion of the vehicle with the airbag in the inflated position and a deflector deflecting the airbag during an oblique frontal impact.
Figure 8A:
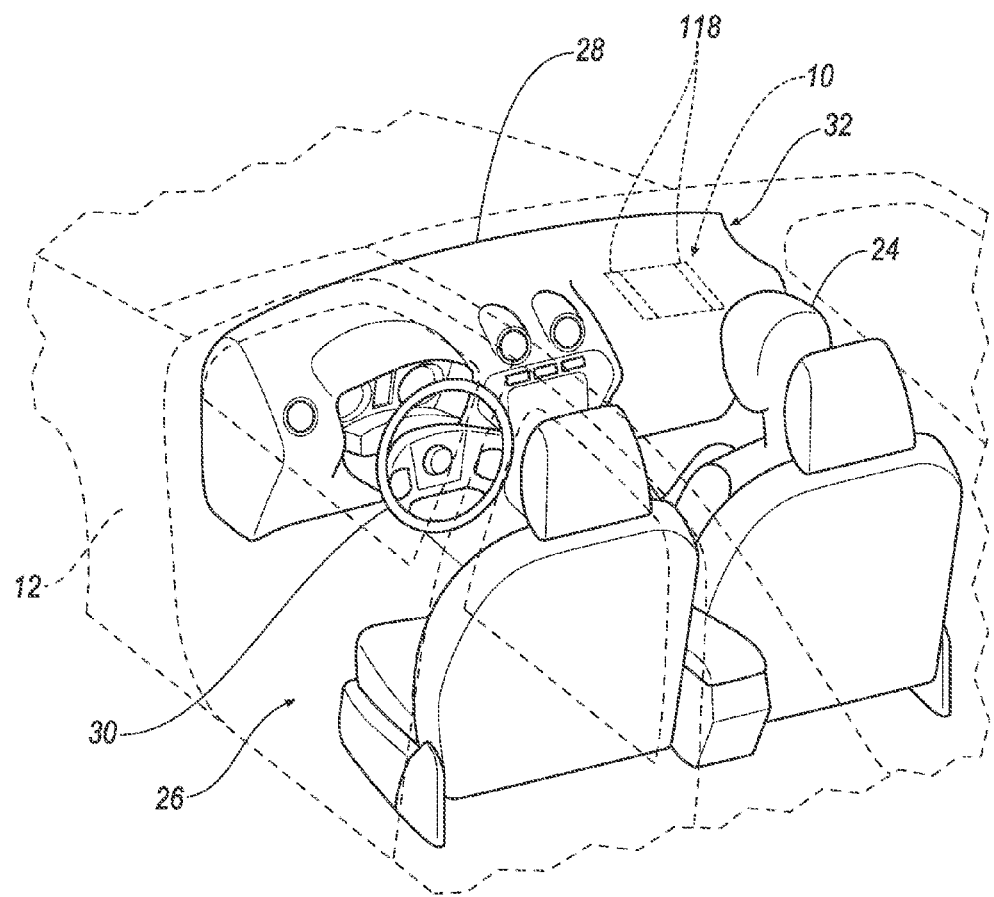
FIG. 8A is a perspective view of a portion of the vehicle including another embodiment of the airbag assembly shown in hidden lines and with an inflatable device in a retracted position.
Figure 8B:
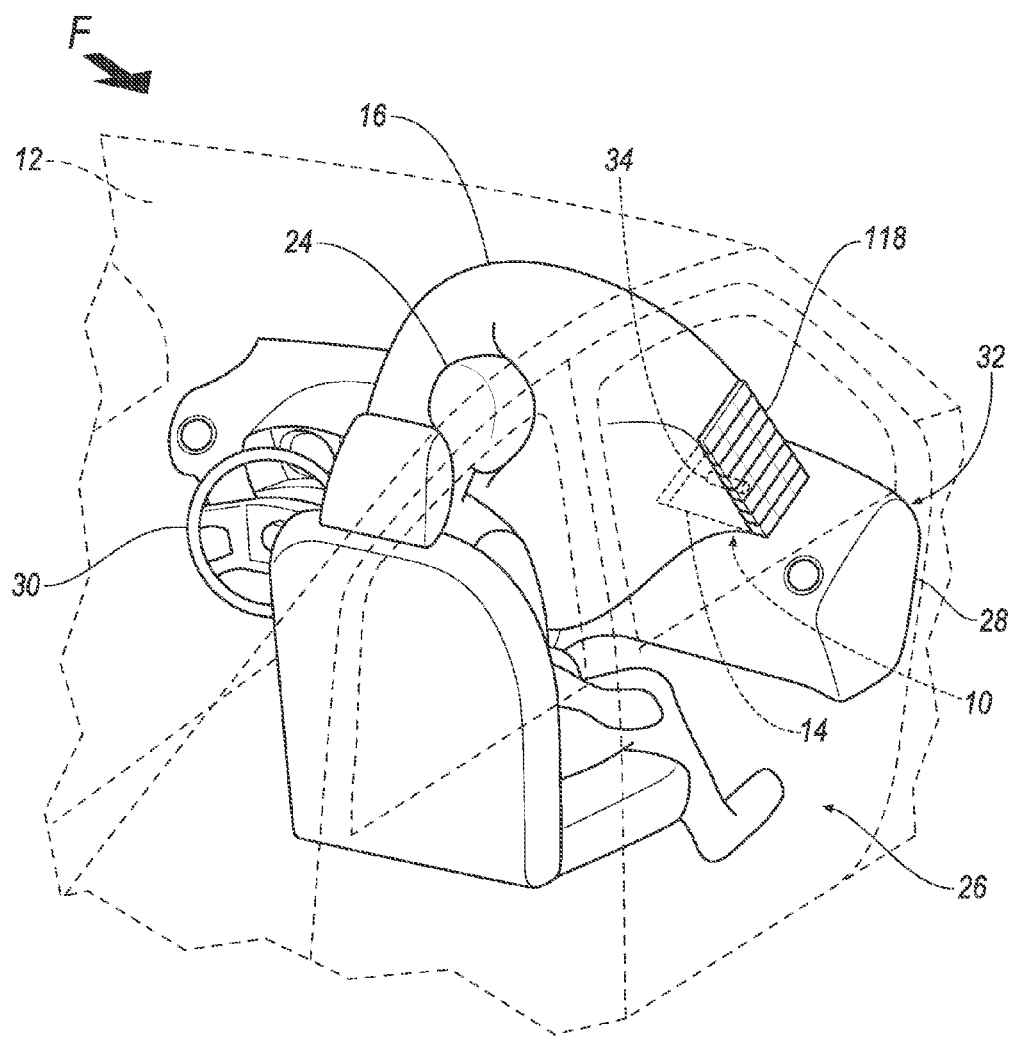
FIG. 8B is a perspective view of a portion of the vehicle of FIG. 8A with the airbag deployed and the inflatable device in an extended position.
Figure 9B:
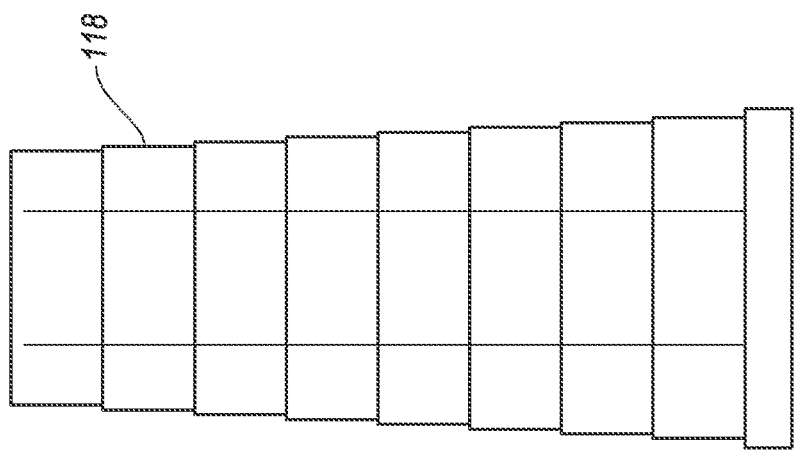
FIG. 9B is a side view of the inflatable device of FIG. 8B in the extended position.

The airbag 16 may be inflated from the uninflated position, as shown in FIGS. 1 and 8A, to the inflated position, as shown in FIGS. 2, 3, and 8B. For example, the airbag 16 may deploy in a vehicle-rearward direction when inflated to absorb energy from the occupant 24 moving, at least in part, in a vehicle-forward direction during a vehicle impact.

The airbag 16 may be formed of any suitable type of material, e.g., from a woven polymer. For example, the airbag 16 may be formed of woven nylon yarn, e.g., nylon 66. Other suitable examples include polyetheretherketone (PEEK), polyetherketoneketone (PEKK), polyester, or any other suitable polymer. The woven polymer may include a coating, such as, for example, silicone, neoprene, urethane, etc. For example, the coating may be polyorganosiloxane.

The deflector 18, 118 is supported by the instrument panel 28. As shown in FIGS. 4A-4B and 8A-8B, as one example, the deflector 18, 118 may be supported on the housing 14 of the airbag assembly 10, i.e., indirectly supported by the instrument panel 28. As another example, the deflector 18, 118 may be supported directly by the instrument panel 28, i.e., through a direct connection between the deflector 18, 118 and the instrument panel 28.

As shown in FIG. 4A, for example, the airbag assembly 10 may include one deflector 18, 118. As another example, as shown in FIGS. 4B and 8A-8B, the airbag assembly 10 may include two deflectors 18, 118. Alternatively, the airbag assembly 10 may include any suitable number of deflectors 18, 118 for deflecting the airbag 16 in any selected direction.

In the example shown in FIG. 4A, the deflector 18, 118 is located on a vehicle-outboard side of the housing 14. In this example, this deflector 18, 118 may deflect the airbag 16 in a vehicle-inboard direction, as shown in FIG. 3, e.g., in response to a vehicle impact that causes the occupant 24 to move toward the vehicle-inboard direction. As another example, as shown in FIGS. 4B and 8A-8B, in addition to the deflector 18, 118 on the vehicle-outboard side of the housing 14, one deflector 18, 118 is located on a vehicle-inboard side of the housing. This deflector 18, 118, i.e., the deflector 18, 118 on the vehicle-inboard side, may deflect the airbag 16 in a vehicle-outboard direction in response to a vehicle impact that causes the occupant 24 to move toward the vehicle-outboard direction (not shown).

With reference to FIGS. 3-6C, the deflector 18 may be a panel that is pivotally coupled to the housing 14 and/or the instrument panel 28. In this embodiment, the panel is designed to deflect the airbag 16 when the lock 20 is in the locked position. Specifically, the deflector 18 may be formed of selected materials, dimensions, and/or shapes to deflect the airbag 16 as the airbag 16 is inflated. The deflector 18 may be rigid relative to the airbag 16, i.e., such that the airbag 16 is deflected by the deflector 18 when impacting the deflector 18 when the airbag 16 is inflated and the lock 20 is in the locked position.

With continued reference to FIGS. 3-6C, the deflector 18 may be constructed from a material, such as metal, plastic, etc. The panel may, for example, include holes, a lattice configuration, etc., to reduce weight of the deflector 18 and/or to optimize deployment of the deflector 18. The panel may have any suitable shape, for example, may be rectangular, rhombus, fan-shaped, arced, chord-shaped, etc. The panel may be planar. The deflector 18 may include multiple components, e.g., panels, that fan apart or otherwise expand as the deflector 18 pivots relative to the housing 14 during inflation of the airbag 16.

With continued reference to FIGS. 4A-6C, a hinge 38 may couple the deflector 18 to the housing 14. The hinge 38 may be a concealed hinge, i.e., the hinge 38 may be concealed between the housing 14 and the deflector 18 when the deflector 18 is in the unlocked position. The hinge 38 may, for example, be any suitable type of hinge 38, such as a butt hinge, pivot hinge, Soss hinge, living hinge, etc.

The hinge 38 may include a rod 40 and a bore 42 rotatably receiving the rod 40. Specifically, one of the deflector 18 and the housing 14 includes the bore 42 and the other of the deflector 18 and the housing 14 includes the rod 40. For example, as shown in FIGS. 4A-5, the deflector 18 includes the bore 42 and the housing 14 includes the rod 40. In this instance, the rod 40 may be fixed to or rotatably engaged with the bore 42, and the rod 40 may be fixed to or rotatably engaged with the housing 14.

The airbag assembly 10 includes means for limiting pivoting of the deflector 18 relative to the instrument panel 28 and/or relative to the housing 14 in response to a sensed oblique frontal impact of the vehicle 12 to deflect the airbag 16 in the inflated position. The means for limiting pivoting may be the lock 20 in a cavity 44 and a plunger assembly 46 in the cavity 44, as described herein, and equivalents thereof.

The lock 20 may be disposed on the hinge 38. Specifically, the lock 20 may be on one of the deflector 18 and the housing 14, which includes the cavity 44, hereinafter referred to as a lock cavity 44, housing the lock 20 in the unlocked position. In the example embodiment shown in FIGS. 3-6C, the lock 20 is supported on one of the rod 40 and the bore 42. For example, as shown in FIGS. 3-6C, the lock 20 may be supported on the bore 42 of the deflector 18. In this example, the lock cavity 44 is on the bore 42 of the deflector 18.

One of the deflector 18 and the housing 14 includes a cavity 48, hereinafter referred to as a receiving cavity 48, that receives the lock 20 in the locked position. Specifically, as set forth above, the lock 20 is supported on one of the rod 40 and the bore 42, and the other of the rod 40 and the bore 42 includes the receiving cavity 48. For example, as shown in FIGS. 6A-6C, the lock 20 is supported on the bore 42 and the rod 40 includes the receiving cavity 48.

Figure 6A:
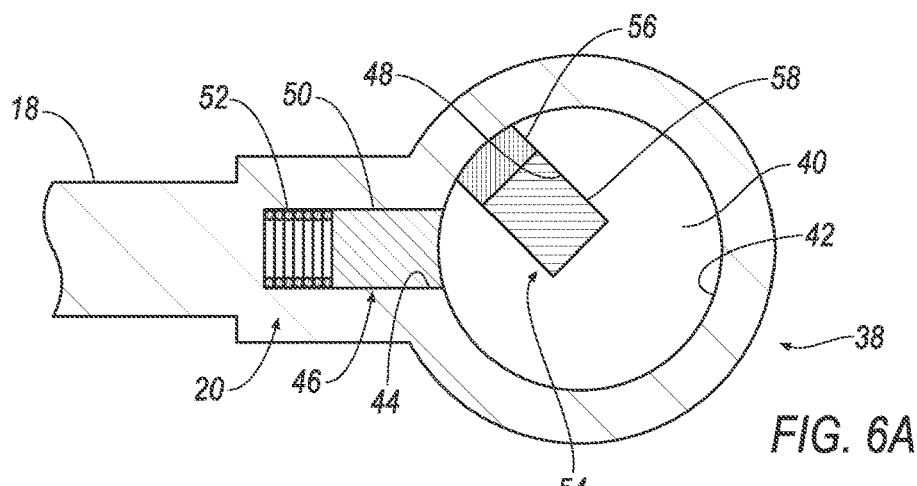
FIG. 6A is a cross-sectional view of a lock of the airbag assembly in an unlocked position when the airbag is in the uninflated position.
Figure 6B:
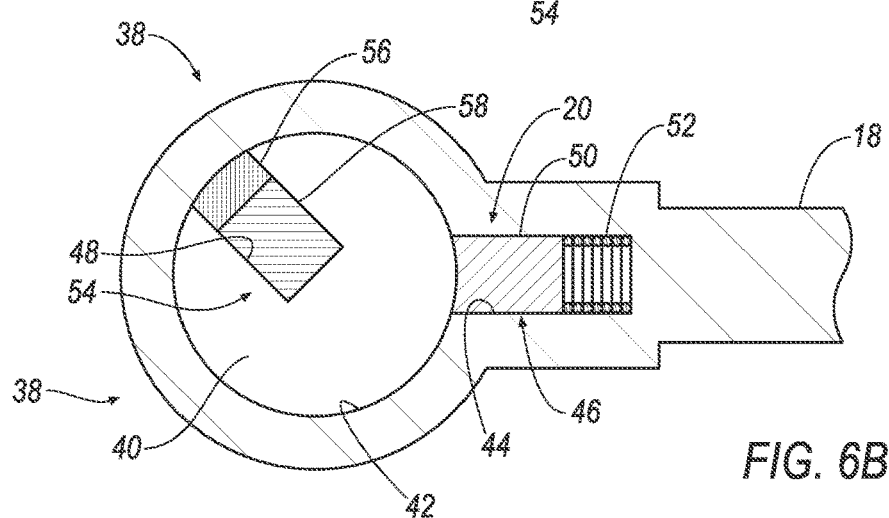
FIG. 6B is a cross-sectional view of the lock in the unlocked position when the airbag is deployed with the airbag pivoting the deflector such that the deflector does not deflect the airbag.
Figure 6C:
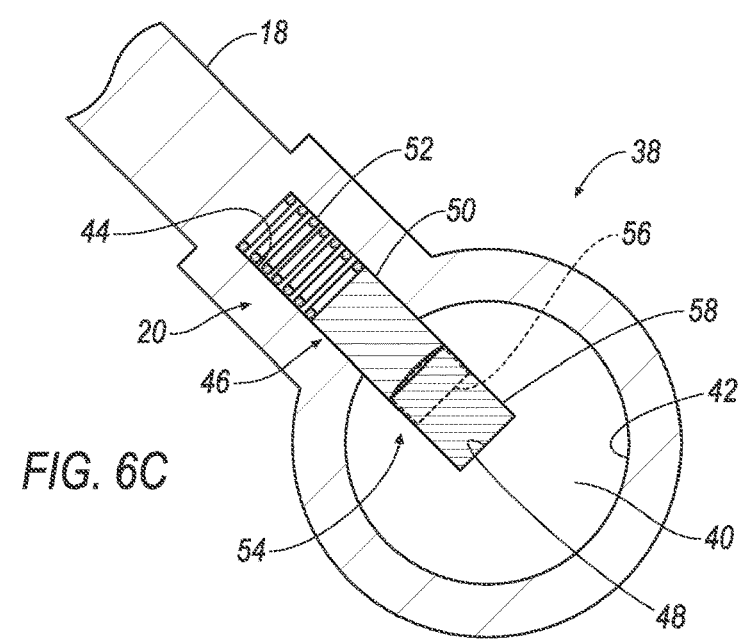
FIG. 6C is a cross-sectional view of the lock in a locked position in which the deflector deflects the airbag.

The lock 20 is movable from the unlocked position, as shown in FIGS. 6A-6B, to the locked position, as shown in FIG. 6C. As shown in FIGS. 6A and 6B, the lock 20 is spaced from the receiving cavity 48 in the unlocked position. Thus, as shown in FIG. 6B, the deflector 18 freely rotates as the airbag 16 is inflated when the lock 20 is in the unlocked position. As shown in FIG. 6C, the lock 20 is engaged with the receiving cavity 48 in the locked position, thus, preventing further rotation of the deflector 18.

The lock 20 may include a plunger 50 moveable relative to the lock cavity 44 from the unlocked position to the locked position. The plunger 50 may be on one of the deflector 18 and the housing 14, which includes the lock cavity 44 housing the plunger 50 in the unlocked position. Specifically, as shown in FIG. 6A-6C, the lock cavity 44 may be on the bore 42 of the deflector 18 and the plunger 50 may be on the bore 42 of the deflector 18.

The lock 20 includes a biasing member 52 that biases the plunger 50 away from the lock cavity 44. For example, as shown in FIGS. 6A-6C, the biasing member 52 may be a spring between the deflector 18 and the plunger 50. The spring may be of any suitable type, e.g., a coil spring. As another example, the biasing member 52 may be any suitable type of mechanical device or an active device, such as a solenoid, that constantly or selectively biases the plunger 50 away from the lock cavity 44.

In the configuration shown in FIGS. 6A-6C, the plunger 50 can ride along the rod 40 as the airbag 16 pivots the deflector 18 about the housing 14 as the airbag 16 deploys. When the receiving cavity 48 is occupied, as shown in FIG. 6B, the plunger 50 passes the receiving cavity 48 and the airbag 16 pivots the deflector 18 open, i.e., the lock 20 does not move to the locked position. When the receiving cavity 48 is empty, as shown in FIG. 6C, the biasing member 52 biases the plunger 50 into the receiving cavity 48 as the airbag 16 pivots the deflector 18 during deployment of the airbag 16.

Specifically, the lock 20 may include a plug assembly 54 that includes a plug 56 removeably disposed in the receiving cavity 48. The plug 56 may be selectively removed from the receiving cavity 48 to allow the plunger 50 to enter the receiving cavity 48 under the bias of the biasing member 52 as the deflector 18 is pivoted by the airbag 16 during deployment of the airbag 16. For example, the plug 56 may remain in the receiving cavity 48 when a full-width frontal impact is sensed to allow the airbag 16 to pivot the deflector 18 beyond the locked position, as shown in FIG. 6B, as the airbag 16 is deployed. The plug 56 may be removed from the receiving cavity 48 when an oblique frontal impact is sensed to allow the airbag 16 to pivot the deflector 18 to the locked position, as shown in FIG. 6C.

The plug assembly 54 may include an activator 58 coupled to the plug 56. The activator 58 may, for example, be a solenoid. In this example, the activator 58, i.e., the solenoid, may selectively maintain the plug 56 in the receiving cavity 48 and selectively retract the plug 56 from the receiving cavity 48. For example, in response to a full-width frontal impact, the activator 58, i.e., the solenoid, maintains the plug 56 in the receiving cavity 48, as shown in FIG. 6B. In response to an oblique frontal impact, the activator 58, i.e., the solenoid, retracts the plug 56 from the receiving cavity 48, as shown in FIG. 6C. As another example, the activator 58 may be a pyrotechnic device. When activated, the pyrotechnic device discharges to remove the plug 56 from the receiving cavity 48.

In another example, in the alternative to the lock 20, the inflator 34 may be in fluid communication with the deflector 18 to selectively limit the pivoting of the deflector 18 relative to the housing 14. For example, the inflator 34 may divert a portion of the inflation medium from the airbag 16 to the deflector 18 to push the deflector 18 in a position that deflects the airbag 16.

Figure 7:
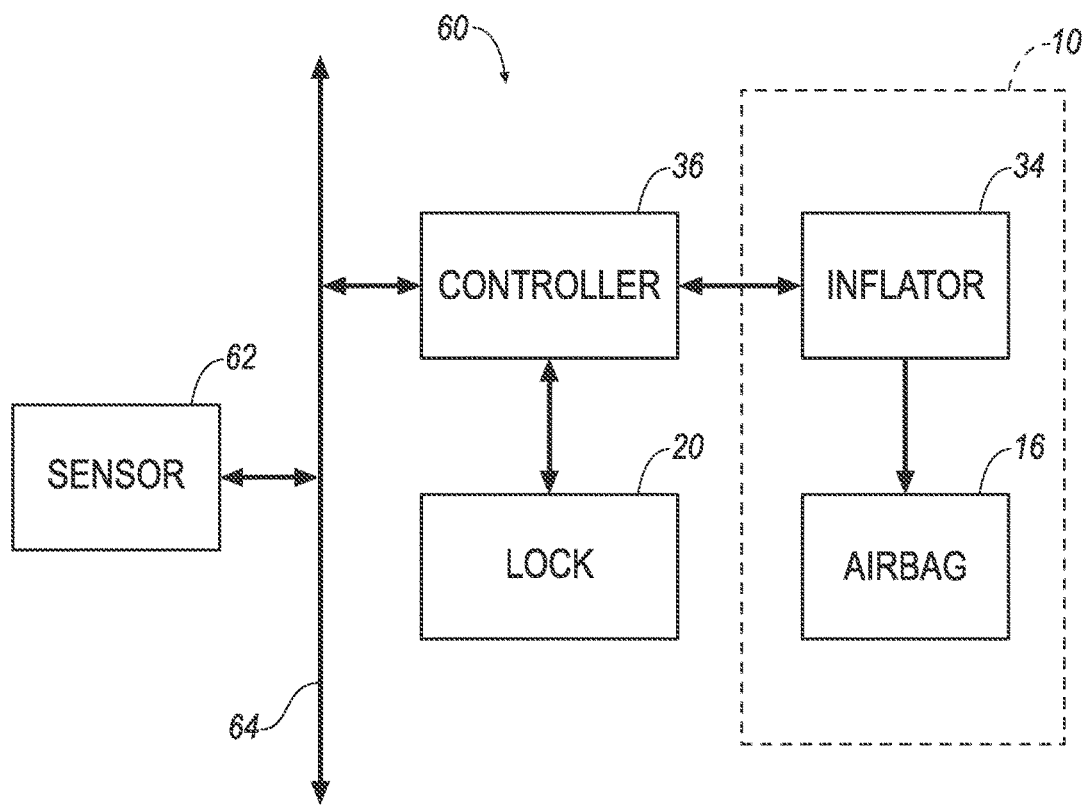
FIG. 7 is a block diagram of a control system.

With reference to FIG. 7, the vehicle 12 may include a control system 60 having a controller 36 in communication with the inflator 34 and/or an impact sensor 62. The controller 36, the inflator 34, and the impact sensor 62 may communicate through a communications network 64.

The controller 36 may be a microprocessor-based controller. The controller 36 may include a processor, memory, etc. The memory of the controller 36 may store instructions executable by the processor.

The impact sensor 62 may be in communication with the controller 36. The impact sensor 62 is adapted to detect an impact, for example an oblique frontal impact, to the vehicle 12. The impact sensor 62 may be of any suitable type, for example, post-contact sensors such as accelerometers, pressure sensors, contact switches; and pre-impact sensors such as radar, LIDAR, and vision-sensing systems. The vision-sensing system may include one or more cameras, CCD image sensors, CMOS image sensors, etc. The impact sensor 62 may be located at numerous points in or on the vehicle 12.

The control system 60 may transmit signals through the communications network 64 (such as a controller area network (CAN) bus), Ethernet, and/or by any other wired or wireless communication network.

In the event of the full-width frontal impact to the vehicle 12, the impact sensor 62 may transmit an instruction through the communications network 64 to the controller 36. The controller 36 is programmed to transmit a signal through the communications network 64 to the activator 58 of the plug assembly 54. Specifically, in response to the sensed full-width frontal impact, the controller 36 instructs the activator 58 to maintain the plug 56 disposed in the receiving cavity 48, as shown in FIG. 6B, and instructs the inflator 34 to inflate the airbag 16. Thus, the airbag 16 pivots the deflector 18 about the housing 14 and the deflector 18 does not deflect the airbag 16 such that the airbag 16 deploys directly toward the occupant 24.

In the event of the oblique frontal impact to the vehicle 12, the impact sensor 62 may transmit an instruction through the communications network 64 to the controller 36. The controller 36 may be programmed to transmit a signal through the communications network 64 to the activator 58 of the plug assembly 54. Specifically, in response to the sensed oblique frontal impact, the controller 36 instructs the activator 58 to remove the plug 56 from the receiving cavity 48 (e.g., by retracting the solenoid, deploying the pyrotechnic device, etc.), as shown in FIG. 6C, and instructs the inflator 34 to inflate the airbag 16. Thus, the airbag 16 pivots the deflector 18 about the housing 14 and the plunger 50 of the lock 20 is biased into the vacant receiving cavity 48 by the biasing member 52. Thus, the deflector 18 is prevented from pivoting further about the housing 14 and deflects the airbag 16 toward the momentum of the occupant 24.

With reference to FIGS. 8A-9B, as another example, the deflector 118 may be an inflatable device, also identified with element numeral 118. The inflatable device 118 may, for example, be inflatable from a retracted position, as shown in FIGS. 8A and 9A, to an extended position, as shown in FIGS. 8B and 9B. In the retracted position, the inflatable device 118 remains retracted, e.g., in the instrument panel 28, so as to not deflect the airbag 16 as the airbag 16 is inflated. In the extended position, the inflatable device 118 is extended, as shown in FIGS. 8B and 9B, to deflect the airbag 16 as the airbag 16 inflates to the inflated position.

The inflatable device 118 is designed to deflect the airbag 16 when the inflatable device 118 is in the extended position. Specifically, the inflatable device 118 may be formed of selected materials, dimensions, shapes, and/or relative position with the airbag 16 to deflect the airbag 16 as the airbag 16 is inflated.

The inflatable device 118 is formed of a plastic material, such as thermoplastic elastomer (TPE), polypropylene (PP), etc. The thermoplastic elastomer is a polymeric material with both thermoplastic and elastomeric properties. A suitable class of TPE material may, for example, be thermoplastic olefin (TPO). The properties of the plastic material of the inflatable device 118 allows the inflatable device 118 to extend from the instrument panel 28 to the modified inflated position toward either a passenger side or a driver side. The manufacturing flexibility afforded by the plastic material may allow the inflatable device 118 to be formed, e.g., blow molded, injection molded, etc., into any suitable shape, size, and thickness. The plastic material of the inflatable device 118 defines an inflation chamber (not shown) that is inflated with an inflation medium, as set forth further below, to inflate the inflatable device 118 to the inflated position.

Figure 9A:
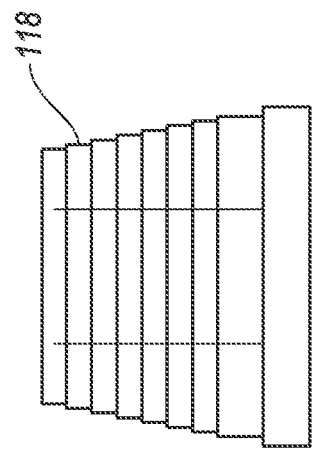
FIG. 9A is a side view of the inflatable device of FIG. 8B in the retracted position.

As one example, with reference to FIGS. 9A and 9B, the inflatable device 118 may include nesting segments that nest within each other in the retracted position, as shown in FIG. 9A. As the inflatable device 118 is inflated to the extended position, the nested segments are extended relative to each other, as shown in FIG. 9B. As another, the plastic material of the inflatable device 118 may include folds, e.g., accordion shaped folds, that are folded when the inflatable device 118 is in the retracted position and unfold as the inflatable device 118 is inflated to the extended position.

Figure 10A:
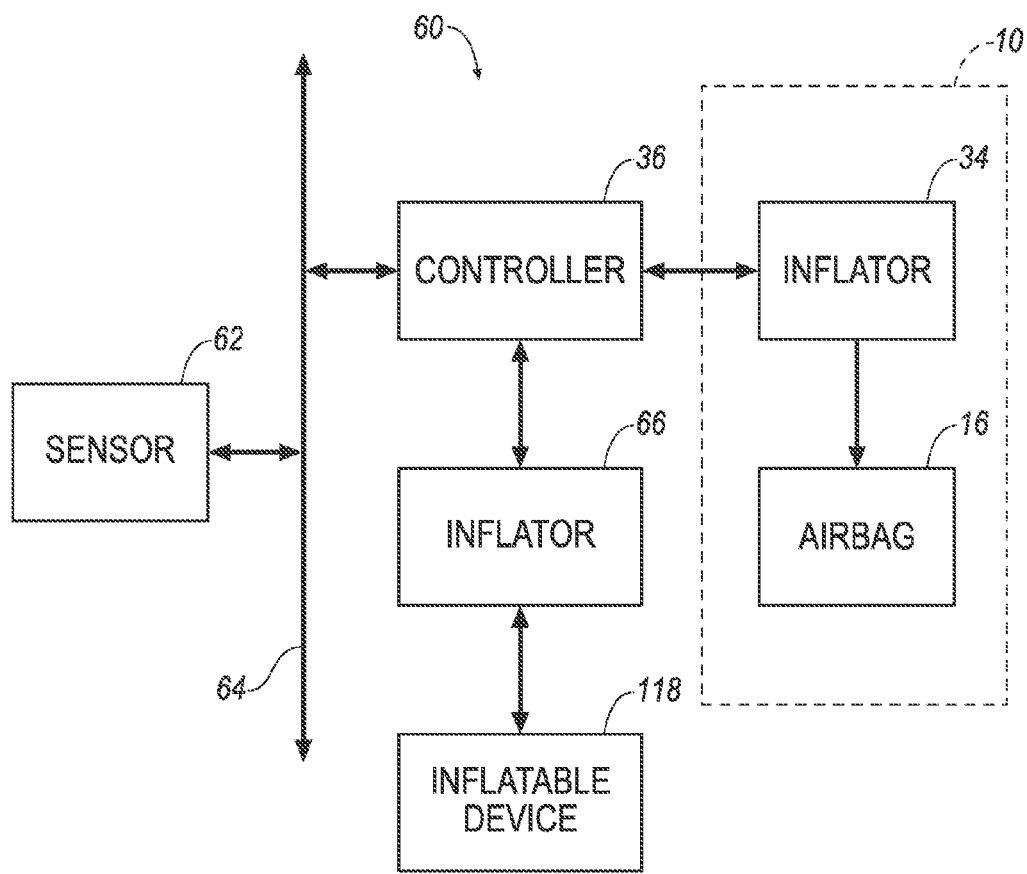
FIG. 10A is a block diagram of a control system of the embodiment of FIGS. 8A-8B.
Figure 10B:
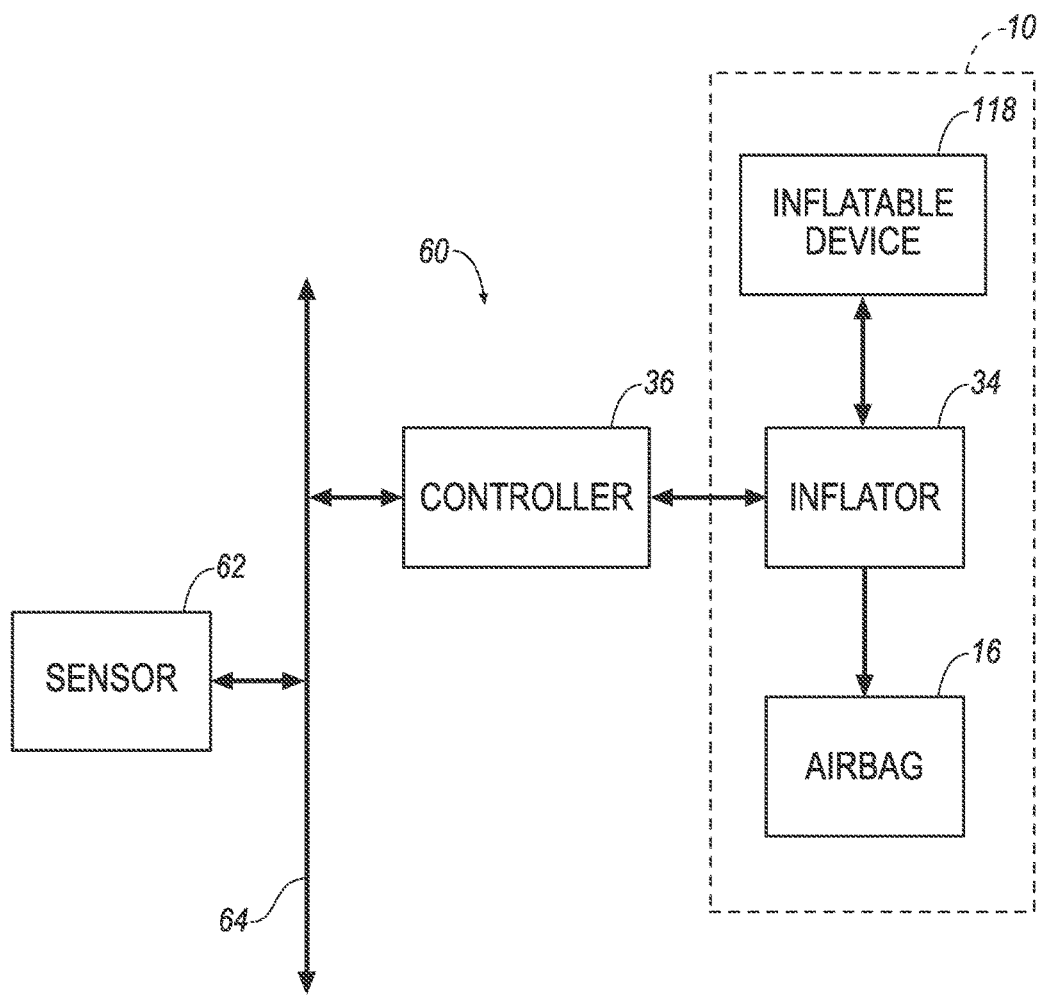
FIG. 10B is a block diagram of another embodiment of the control system of the embodiment of FIGS. 8A-8B.

The inflatable device 118 may be inflated from the retracted position to the extended position in any suitable manner. As one example, as shown in FIG. 10A, the inflatable device 118 may include an inflator 66, e.g., dedicated to the inflatable device 118, that inflates the inflatable device 118 from the retracted position to the extended position. As another example, as shown in FIG. 10B, the inflator 34 may be in fluid communication with the inflatable device 118 such that the inflator 34 inflates both the airbag 16 and the inflatable device 118. In this example, the inflator 34 may include a diverter (not shown) that selectively directs inflation medium to the inflatable device 118, e.g., either diverts some inflation medium to the inflatable device 118 and some inflation medium to the airbag 16, or diverts no inflation medium to the inflatable device 118 and all of the inflation medium to the airbag 16. The diverter may be controlled based on the sensed direction of impact of the vehicle 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:
   a housing;
   an airbag supported by the housing;
   a deflector pivotally coupled to the housing;
   a lock between the deflector and the housing, the lock being moveable by the airbag relative to the deflector and the housing from an unlocked position disengaged with at least one of the deflector and the housing to a locked position engaged with both the deflector and the housing; and
   a hinge coupling the deflector to the housing, wherein the lock is disposed on the hinge.

2. The airbag assembly as set forth in claim 1, wherein one of the deflector and the housing includes a rod of the hinge and the other of the deflector and the housing includes a bore of the hinge rotatably receiving the rod, wherein the lock is supported on one of the rod and the bore.

3. The airbag assembly as set forth in claim 2, wherein the other of the bore and the rod includes a cavity receiving the lock in the locked position.

4. The airbag assembly as set forth in claim 1, wherein one of the deflector and the housing includes a cavity receiving the lock in the locked position, the lock being spaced from the cavity in the locked position.

5. The airbag assembly as set forth in claim 4, further comprising a plug assembly in the cavity, the plug assembly including a plug removeably disposed in the cavity.

6. The airbag assembly as set forth in claim 5, wherein the plug assembly includes an activator connected to the plug.

7. The airbag assembly as set forth in claim 6, wherein the activator is a pyrotechnic device.

8. The airbag assembly as set forth in claim 4, wherein the lock includes a plunger moveable relative to the cavity from the unlocked position to the locked position.

9. The airbag assembly as set forth in claim 8, wherein the other of the deflector and the housing includes another cavity housing the plunger in the unlocked position.

10. The airbag assembly as set forth in claim 8, wherein the lock includes a spring between the other of the deflector and the housing and the plunger.

11. A restraint system comprising:
    an instrument panel;
    an airbag supported by the instrument panel;
    a deflector pivotally coupled to the instrument panel; and
    a lock between the deflector and the instrument panel, the lock being moveable relative to the deflector and the instrument panel from an unlocked position disengaged with at least one of the deflector and the instrument panel to a locked position engaged with both the deflector and the instrument panel.

12. The restraint system as set forth in claim 11, wherein the deflector is supported directly on the instrument panel.

13. The restraint system as set forth in claim 11, wherein one of the deflector and the instrument panel includes a cavity receiving the lock in the locked position, the lock being spaced from the cavity in the unlocked position.

14. The restraint system as set forth in claim 13, further comprising a plug assembly in the cavity, the plug assembly including a plug removeably disposed in the cavity.

15. The restraint system set forth in claim 14, wherein the plug assembly includes an activator connected to the plug.

16. The restraint system set forth in claim 15, further comprising a controller programmed to command the activator to remove the plug from the cavity.

17. The restraint system as set forth in claim 13, wherein the lock includes a plunger moveable relative to the cavity from the unlocked position to the locked position.

18. The restraint system as set forth in claim 11, further comprising a controller programmed to provide an instruction to move the lock to the locked position.

19. A restraint system for a vehicle, the restraint system comprising:
   an instrument panel;
   an airbag supported by the instrument panel and being inflatable to an inflated position;
   a deflector pivotally coupled to the instrument panel; and
   means for limiting pivoting of the deflector relative to the instrument panel in response to a sensed oblique frontal impact of the vehicle to deflect the airbag in the inflated position by moving relative to the deflector and the instrument panel from an unlocked position disengaged with at least one of the deflector and the instrument panel to a locked position engaged with both the deflector and the instrument panel.

* * * * *